United States Patent

Anderson et al.

Patent Number: 5,521,919
Date of Patent: May 28, 1996

[54] METHOD AND APPARATUS FOR PROVIDING SWITCH-BASED FEATURES

[75] Inventors: Thomas W. Anderson, Naperville; Thomas E. Bowers, Warrenville; Charles C. Byers, Aurora, all of Ill.

[73] Assignee: AT&T Corp., Murray Hill, N.J.

[21] Appl. No.: 334,308

[22] Filed: Nov. 4, 1994

[51] Int. Cl.$^6$ .......................... H04Q 11/08; H04M 3/00
[52] U.S. Cl. .................. 370/68; 379/347; 379/410; 370/66
[58] Field of Search ...................... 370/58.1, 63, 66, 370/67, 68, 110.1; 379/347, 410

[56] References Cited

U.S. PATENT DOCUMENTS

| | | | |
|---|---|---|---|
| 4,540,850 | 9/1985 | Herr et al. | 379/202 |
| 4,991,169 | 2/1991 | Davis et al. | 370/58.1 X |
| 5,195,132 | 3/1993 | Bowker et al. | 379/410 |
| 5,313,459 | 5/1994 | Matern | 370/58.1 |
| 5,388,185 | 2/1995 | Terry et al. | 395/2.14 |

Primary Examiner—Jeffery Hofsass
Assistant Examiner—Daniel S. Hunter
Attorney, Agent, or Firm—Michael B. Johannesen

[57] ABSTRACT

A system and method to provide voice enhancement circuits on a voice path on an individual basis, without having in-line circuits inserted into the lines or trunks. The enhancement circuit is inserted within one or more of the switches. This system comprises a switching system having a switching fabric and a central control, wherein the switching fabric includes several extended time slot interchange (XTSI) units connected to a time multiplex switch. The extended time slot interchange unit has approximately twice the capacity of a standard time slot interchange unit. Such XTSI is connected to voice enhancing circuits, which the TSI may then switch enhancement circuits into a call path. A method of setting up a call according to this invention includes routing the call to a switch, routing the call in the switch into an XTSI, which routes a call through the enhancement circuit, and then back through the XTSI.

12 Claims, 5 Drawing Sheets

METHOD AND APPARATUS FOR PROVIDING SWITCH-BASED FEATURES

TECHNICAL FIELD

This invention relates to the field of telecommunication networks, and, more specifically, to a method and apparatus for providing echo cancelers and other voice enhancement capabilities on a switch that, in the prior art, can only be provided "in-line" with lines or trunks.

BACKGROUND OF THE INVENTION

Network telephone voice enhancement services are provided "in-line" with transmission facilities. These services are incorporated in thinks which are in turn connected between switching systems, because such services cannot otherwise be added into the circuit. An illustration of this system may be seen in the example of FIG. 1, wherein a long distance network is shown. Telephone 101 is connected to a local switch 102, which is, in turn, connected to an originating long distance switch 103 by access trunk 104. Originating switch 103 is connected to a terminating switch 105, via trunk 106. The terminating switch is connected to a local exchange carrier switch represented by 108. The call is completed to telephone 109. As can be seen in this figure, there are two echo cancelers, 110 and 111, connected between originating switch 103 and terminating switch 105, on trunk 106. Echo canceler 110 cancels echoes of telephone 101, and echo canceler 111 cancels echoes from telephone 109. Other voice enhancement facilities, such as AT&T's True Voice ® voice enhancement services are also connectable to trunk 106 in order to further enhance the sound of the voice signal.

There are, however, several drawbacks to the configuration of FIG. 1. First, failures in these in-line enhancement circuits require that the trunk be taken out of service, which may cause calls to be lost. For example, any failure in either echo canceler 110 or 111, or both, will cause trunk facility 106 to be lost. The result is that fewer long distance calls can be completed between switch 103 and switch 105, and, if the failure occurs during an active call, may result in the call being torn down. Second, all circuits are routinely tested, which means that in order for switch 103 to test echo canceler 110, it must take trunk 106 out of service, and further, must alert switch 105 that it is doing so. Switch 105 must cooperate in the test of echo canceler 110 and report back to switch 103. The same scenario holds true when switch 105 tests echo canceler 111. Further, new voice enhancement features cannot economically be introduced until all trunks incorporating the new feature are connected to a particular switch, since 100% deployment is required to guarantee that the enhancement is available for all calls.

Additionally, long distance companies are now entering the interlata telephone service market by connecting telephone calls between local switches in the same service area. So, for example, in FIG. 1, when telephone 101 connected to local switch 102 calls telephone 112 connected to local switch 114, instead of connecting through a trunk connected between the local exchange carrier switches or, alternatively, connecting through a tandem operated by the local exchange carrier, the user at telephone 101 may cause the call to be connected through switch 103 instead.

In such cases, the telephone service provider that owns switch 103 would like to be able to offer enhanced services which differentiate from the local exchange carrier. To this end, it is desirable to have voice enhancement services and features on access trunks 104 and 118. However, in order to provide such voice enhancement features, the telephone service provider that owns switch 103 must have the cooperation of the local exchange carrier in order to routinely maintain such services in line on access trunks 104 and 118. Such cooperation may be difficult to obtain when the service providers are in competition for the same telephone traffic.

Therefore, a problem in the art is that there is no system for adding voice enhancement circuits other than building them in-line with trunks.

SUMMARY OF THE INVENTION

This problem is solved and a technical advance is achieved in the art by a system and method which can switch voice enhancement circuits into a voice path on an individual call basis. Therefore, no in-line enhancement circuits need be built into lines or trunks; enhancement circuits are instead inserted within one or more of the switches. This system is provided by a switching system comprising a switch fabric and a central control, wherein the switch fabric includes a plurality of extended time slot interchange (XTSI) units connected to one or more time multiplex switches. The extended time slot interchange unit includes approximately twice the capacity of a standard time slot interchange unit, in order to connect a plurality of enhancement circuits into a call path. A method of setting up a call according to this invention includes routing the call to a switching system, routing the call in the switching system into an extended time slot interchange (TSI) unit, which routes the call through the enhancement circuit, and then routes the call back through the XTSI to the normal routing process.

BRIEF DESCRIPTION OF THE DRAWINGS

A more complete understanding of the invention may be obtained from the consideration of the following description in conjunction with the drawings, in which.

DETAILED DESCRIPTION

Figure 1:
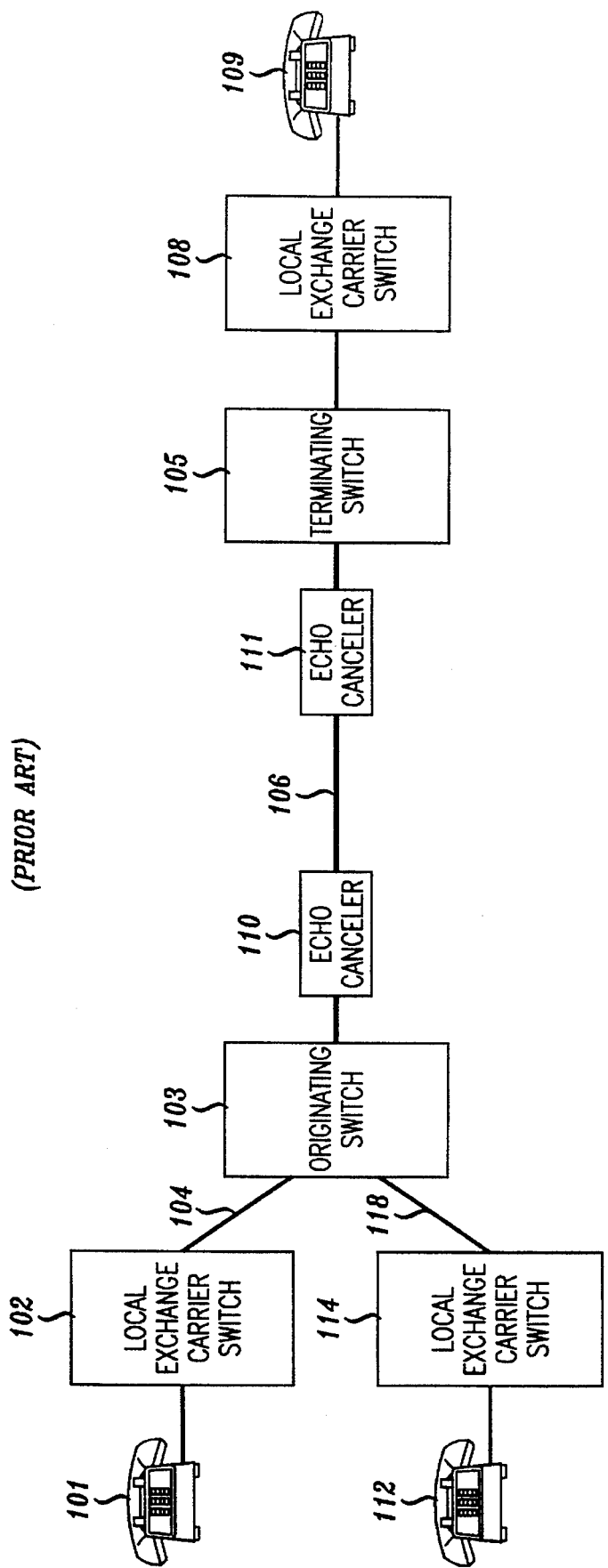
FIG. 1 is a block diagram of a prior art telephone network showing two switches interconnected by a trunk incorporating voice enhancement circuits.
Figure 2:
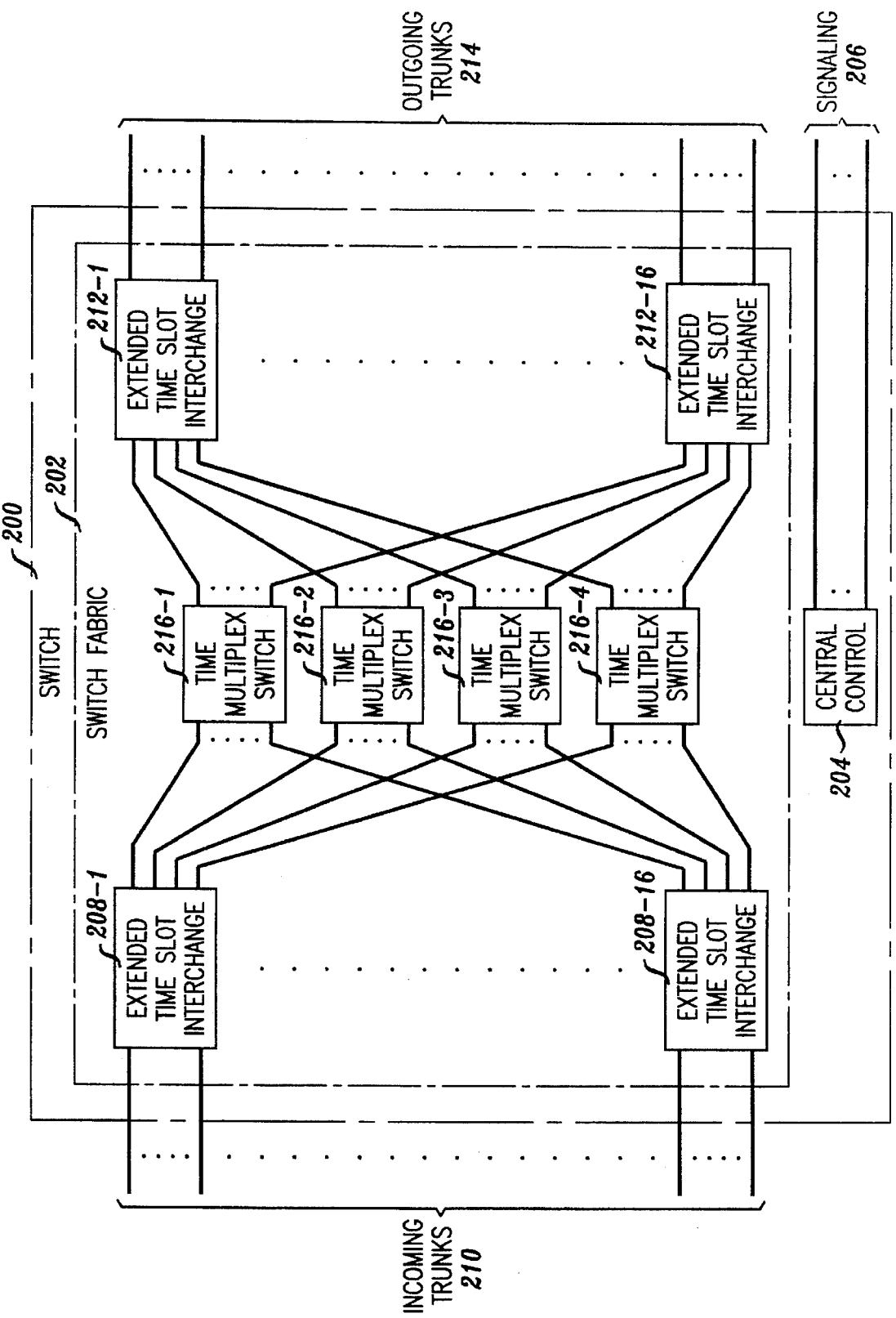
FIG. 2 is a block diagram of a switching system, illustrating an exemplary embodiment of this invention.

FIG. 2 illustrates a block diagram of a switching system according to an exemplary embodiment of this invention. Switch 200 comprises a "toll" switch, or long distance switch, such as an AT&T 4ESS™ switch. The 4ESS switching system is more fully described in the Bell System Technical Journal, volume 56, number 7 (pages 1015–1320), September, 1977, which is incorporated herein by reference. Switch 200 includes switch fabric 202 and central control 204, as is known in the art. Central control 204 provides routing information for switch fabric 202 and performs other tasks including signaling and maintenance, as is known in the art. Central control 204 is connected to other switching systems via signaling network 206.

Switch fabric 202, according to an exemplary embodiment of this invention, comprises a plurality of extended time slot interchange (XTSI) units 208-1–208-16, connected to incoming trunks 210. There are also a plurality of XTSI's 212-1–212-16 connected to outgoing trunks 214. Incoming XTSI's 208 and outgoing XTSI's 212 are interconnected via a plurality of time multiplex switches (TMS) 216-1–216-4. Time multiplex switches 216 are known in the art, and described in the above reference. The number of XTSI units and TMS units are given merely to illustrate an exemplary embodiment of this invention, and may be varied without departing from the scope of this invention. Further, prior art time slot interchange units and trunk interfaces may be intermixed with XTSI's, thus providing flexibility in the configuration of switch fabric 202. A configuration of switch 200 in FIG. 2 is merely illustrative, in that incoming XTSI's 208 and outgoing XTSI's 212 are really in the same box and are interconnected by TMS's 216. The symmetrical illustration of FIG. 2 is for the purposes of clarity. Central control 204 is connected to all XTSI's 208 and 212, and time multiplex switches 216, but such connections are not shown for clarity.

Figure 3:
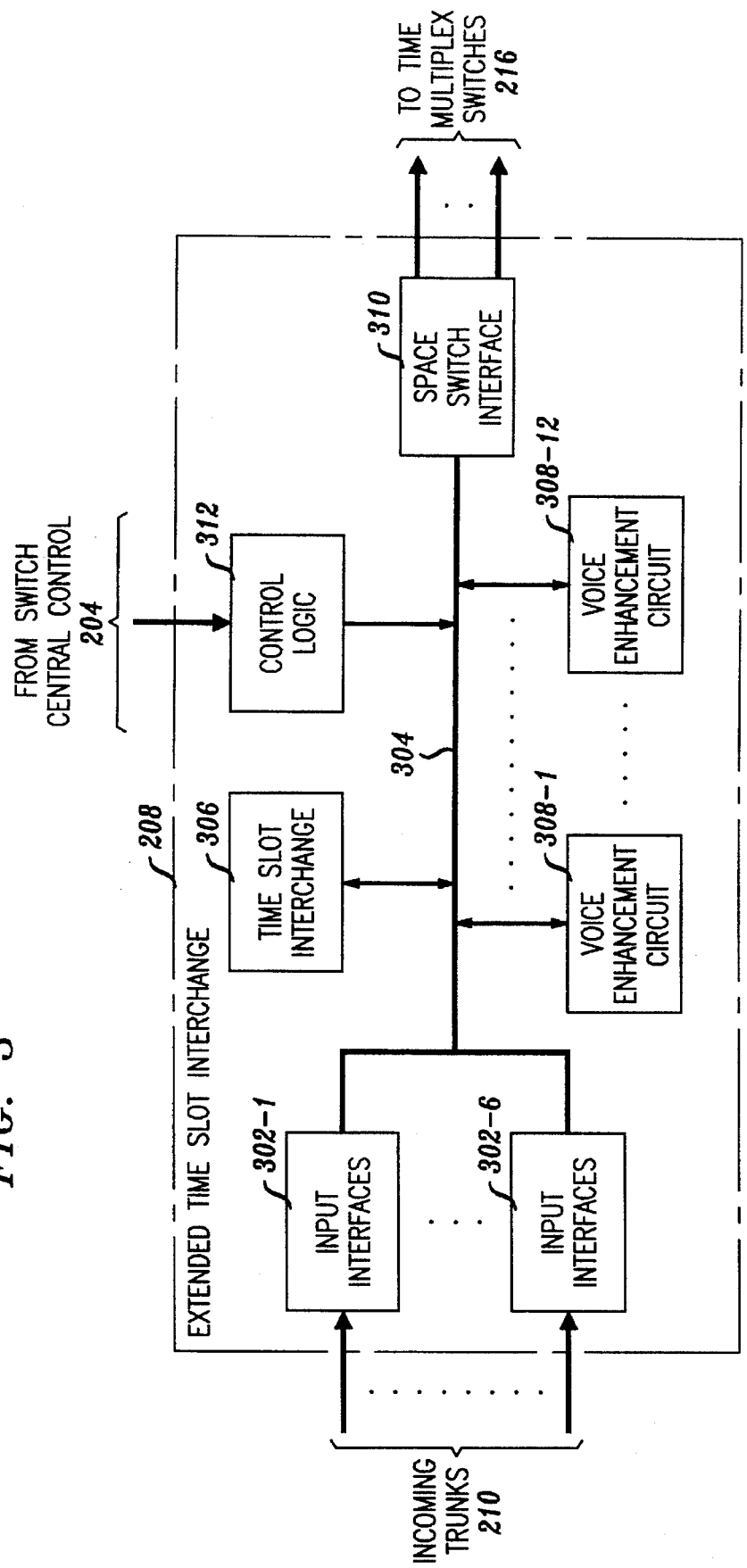
FIG. 3 is a block diagram of an extended time slot interchange unit used in the toll switching system of FIG. 2.

A block diagram of an XTSI, according to an exemplary embodiment of this invention, is shown in FIG. 3. An incoming XTSI 208 is illustrated, however, outgoing XTSI's such as 212 are a mirror image of this illustration. Incoming trunks 208 deliver a data stream (i.e., 64 Kbps PCM representing speech) to input interfaces 302. In the exemplary embodiment of this invention there may be up to six input interfaces 302-1–302-6. Input interfaces 302 deliver data to a bus 304. Bus 304 is common to all of the units in XTSI 208 and is used for both data and control information. Input interfaces 302 deliver data to bus 304 and then to time slot interchange 306. Time slot interchange 306 comprises a time slot interchanger which exchanges time slot data, as is know in the art and described in the above reference. However, time slot interchange 306 is twice as large as required for normal switching needs. As will be seen below, the extra capacity for time slot interchange 306 permits voice enhancement circuits to be added to the voice data stream.

In this exemplary embodiment, time slot interchange 306 causes the voice data stream to be routed back to bus 304 and then to one of the voice enhancement circuits 308-1–308-12. In this embodiment there may be 12 different voice enhancement circuits. Generally, there are ten active and two spare. However, any configuration is permissible. Furthermore, there may be a mixture of different voice enhancement circuits 308 within TSI 208. For example, there may be two or three echo canceling circuits, several True Voice® circuits and other enhancement circuits. There may also be spare slots to provide space for new voice enhancement services as they become available.

In this exemplary embodiment, voice enhancement circuits 308 may be selectively switched into call paths. Such selectivity may depend upon call type, feature subscription, originating or terminating telephone number, etc. Switch 200 performs a database lookup in central control 204 to determine if a call being routed through the switch receives voice enhancement services, and if so, which one. There may also be different levels of services provided by voice enhancement circuits 308. For example, one voice enhancement circuit 308 may provide echo cancellation only, while another provides echo cancellation and signal quality enhancement. Such enhancement may be spectral shaping and/or amplitude equalization. Further, more than one voice enhancement circuit 308 may be serially added to a call path to provide multiple types of features for a call. Thus, a variety of voice enhancement services may be provided without having to have trunks with built-in features and all the problems associated with them. Enhancement circuits may be added, diagnosed, removed from service, etc., without affecting other switches, or even other enhancement circuits. Additionally, voice enhancement services and features that were previously only offered on "long distance" calls may, by use of this invention, now be offered in the "short haul" market.

Returning to FIG. 3, voice enhancement circuit 308 delivers the processed data stream back to bus 304, and then to time slot interchange 306. Time slot interchange 306 again exchanges the time slot of the data and then moves the data back to bus 304, which is then received by space switch interface 310. Space switch interface 310 delivers data to one of the time multiplex switches 216 (FIG. 2), as is known in the art. TSI 208 is configured by control logic 312, which sets up the routes through XTSI 208, according to information delivered by central control 204 (FIG. 2).

Figure 4:
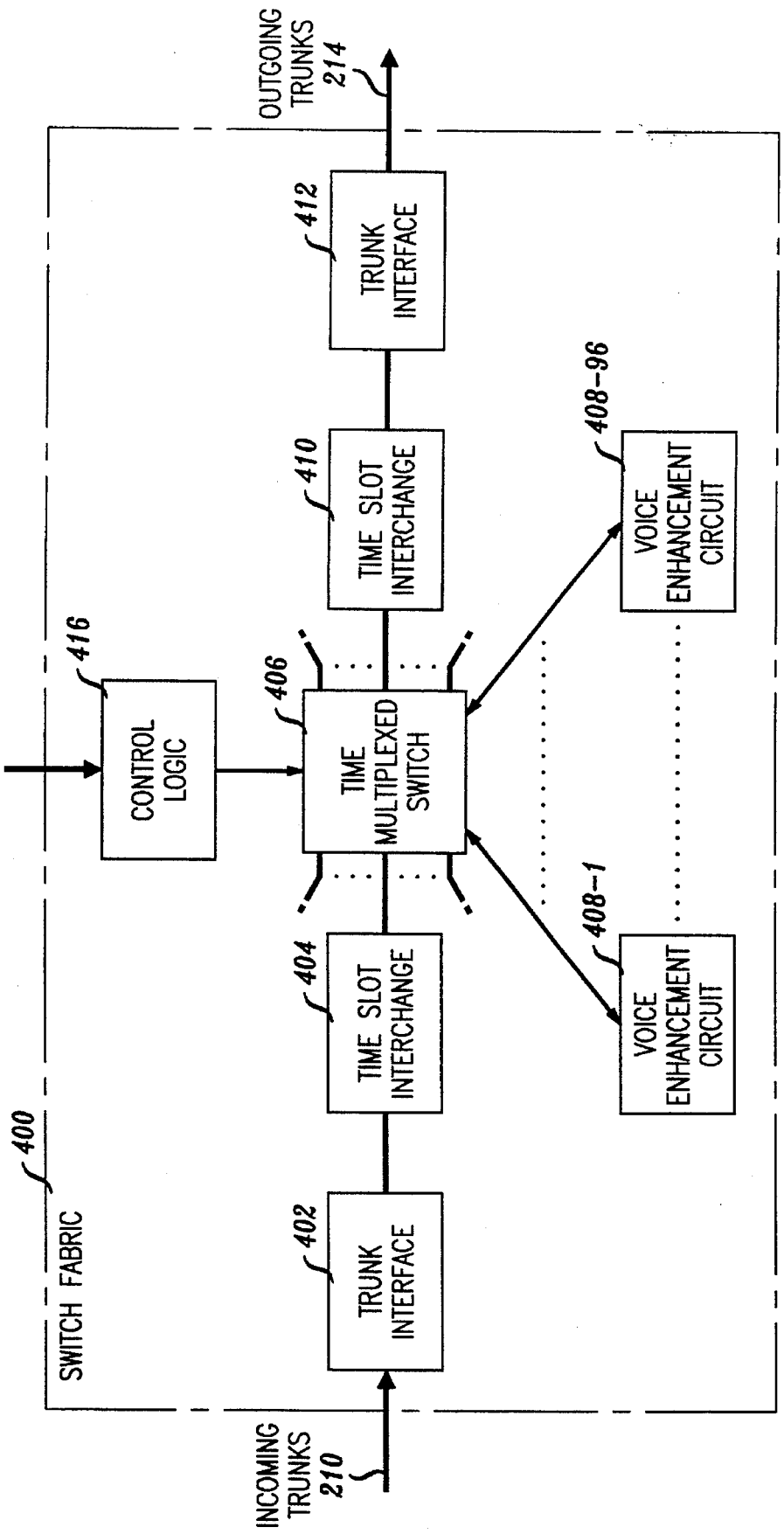
FIG. 4 is a block diagram of a switching system according to an alternative embodiment of this invention.

Turning now to FIG. 4, an alternative embodiment of this invention is shown. According to this embodiment, incoming data (again 64 Kbps PCM voice data) is received from incoming trunks 210 at a line interface circuit 402. Line interface circuit 402 is identical to that known and used in the art. Line interface 402 delivers the data to time slot interchange unit 404, which is identical to that currently used in the art and described in the reference cited above. Time slot interchange unit 404 delivers the data to time multiplex switch fabric 406. TMS 406 is twice as large as a TMS from the prior art, so that it may receive data from all time slot interchanges in the switch, such as 404, and then routes data to one of a plurality of voice enhancement circuits 408. Again, there may be any number of voice enhancement circuits of various types 408-1–408-96, according to this alternative embodiment. After the voice enhancement circuit has processed the data, it returns the data to TMS 406, which then routes the data to the outgoing time slot interchange 410. Time slot interchange 410 then interchanges the time slots and delivers the data to an outgoing line interface 412. Outgoing line interface, as is known in the art, delivers the data to outgoing trunks 214.

Figure 5:
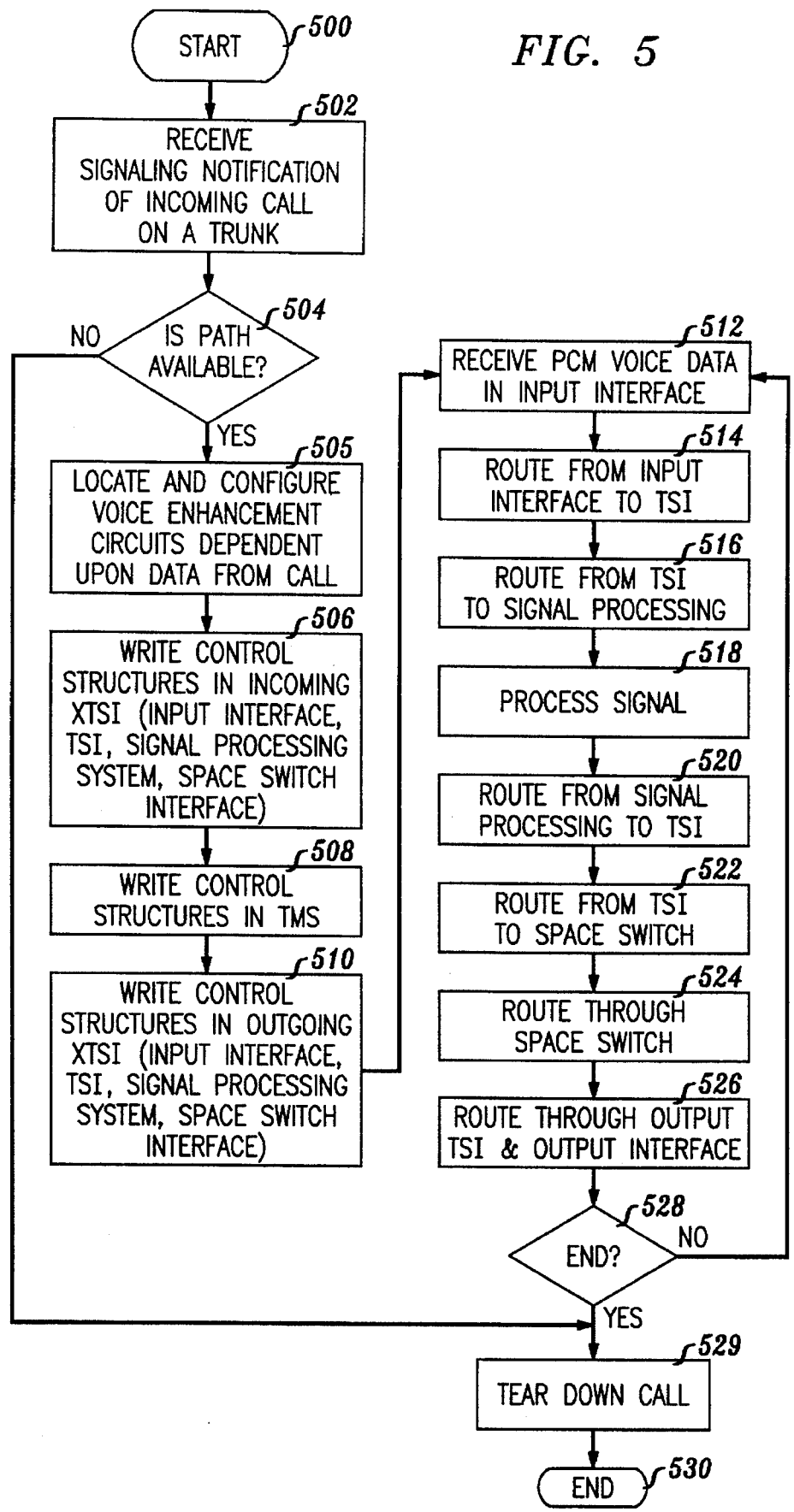
FIG. 5 is a flow chart of the operation of a switching system according to this invention.

Turning now to FIG. 5, a flow chart according to the first exemplary embodiment of this invention is shown. Processing starts in FIG. 5 and moves to action box 502 where switch 200 (FIG. 2) receives signaling notification of an incoming call on a trunk at central control 204. Central control 204 determines if a path is available in decision diamond 504. If a path is not available then processing jumps to call tear down box 529.

If a path is available in decision diamond 504, then processing continues to action box 505. In action box 505, the voice enhancement circuits are selected, based on call data (i.e., call type, called number, calling number, etc.). Processing continues to action box 506, where central control 204 sends a message to the incoming XTSI which causes control logic 312 to write control structures in the input interface, TSI, voice enhancement circuit, space switch interface. Processing continues to action box 508 where central control 204 writes control structures in one of the TMS's 216. Processing continues to action box 510 where central control 204 writes the control structures in the outgoing XTSI. Processing then continues to action block 512 where PCM voice samples are received on one of the incoming trunks 210.

In box 512, data is received in the input interface and then data is moved from the voice interface in action box 514 to the TSI. The TSI in action box 516 routes the data to the signal processor. In action box 518, the signal is processed. In action box 518 the process signal is then routed from the signal processor back to the TSI. In box 520, the process signal is routed from the TSI to the space switch through the space switch interface. Next, in action box 522, the processed signal is routed through the space switch and then delivered to the TSI in box 524. The data is then routed through the TSI to the output interface. In action box 526 a determination is made if this call is at an end. If not, then processing returns to action box 512 and more data is routed through the system where the call is completed, the call is torn down in box 529, and processing ends at 530.

It is to be understood that the above-described embodiments are merely illustrative principles of the invention and that many variations may be devised by those skilled in the art without departing from the scope of the invention. It is, therefore, intended that such variations be included within the scope of the claims.

We claim:

1. A method for enhancing the quality of a telephone call within a switching system, said switching system being connected to other switching systems via trunks, said call comprising speech signals, said switching system including a switching stage, said switching stage having an input and output stage and at least one intermediate stage, said input and output stage comprising a plurality of timeslots, said plurality of timeslots being much greater in number than required by said at least one intermediate stage, and a signal processing circuit connected to said input and output stages, said method comprising the steps of:

receiving said call at said input and output stage on a first timeslot;

said input and output stage routing said speech signals on a second selected one of said plurality of timeslots into said signal processing circuit;

said signal processing circuit processing said speech signals and returning said processed speech signals to said input and output stage stage on a third selected one of said plurality of timeslots; and said input and output switching said processed speech signals to either said intermediate stage or to a trunk on a fourth selected one of said plurality of timeslots.

2. A method according to claim 1 wherein said signal processing circuit comprises a plurality of signal processing means enhancing signal quality, and wherein said step of routing said speech signals into said signal processing circuit comprises selecting for each individual call one of said plurality of signal processing means and routing said speech signals into said selected one of said plurality of signal processing means.

3. A method according to claim 2 wherein said call include a call type, wherein said step of selecting one of said plurality of signal processing means is based on said call type.

4. A method according to claim 1 wherein said call include a call type, further including selecting ones of said calls processed by said switching system for routing to said signal processing circuit based on said call type.

5. An apparatus for enhancing speech signals in a switching system, said switching system being connected to a telephone network via trunks, said apparatus comprising:

switching means for routing said speech signals from one of a plurality of inputs to one of a plurality of outputs, said switching means comprising an input and output stage and an intermediate stage, said input and output stage each comprising a plurality of timeslots, said plurality of timeslots being much greater in number than required by said intermediate stage; and signal enhancement means for enhancing said call signals connected to said switching means on said plurality of timeslots such that said speech signals are routed to said signal enhancement means via said input and output means over selected ones of said plurality of timeslots, without affecting other call processing.

6. An apparatus according to claim 5 wherein said signal enhancement means comprises a plurality of signal processing circuits.

7. An apparatus according to claim 6 wherein said input and output means selectively routes speech signals to one of said plurality of signal processing circuits based on call type.

8. An apparatus according to claim 5 wherein said input and output means comprises a timeslot interchange unit.

9. An apparatus according to claim 5 wherein said signal enhancement means comprises echo cancelers.

10. An apparatus according to claim 5 wherein said signal enhancement means comprises noise filters.

11. An apparatus according to claim 5 wherein said signal enhancement means comprises speech signal spectral shaping.

12. An apparatus according to claim 5 wherein said switching means includes a time switch.

* * * * *

UNITED STATES PATENT AND TRADEMARK OFFICE
CERTIFICATE OF CORRECTION

PATENT NO. : 5,521,919
DATED : May 28, 1996
INVENTOR(S) : Thomas W. Anderson, Thomas E. Bowers, Charles C. Byers It is certified that error appears in the above-identified patent and that said Letters Patent is hereby corrected as shown below:

<u>Column 5, claim 1,</u>
Line 42, after "output" insert -- stage --.

Signed and Sealed this

Fifteenth Day of January, 2002

Attest:

JAMES E. ROGAN
*Director of the United States Patent and Trademark Office*

*Attesting Officer*